G. Meldrum,
Turning Regular Forms,
Nº 10,783. Patented Apr. 18 1854.

Witnesses:

Inventor:

Garret Meldrum

UNITED STATES PATENT OFFICE.

GARRET MELDRUM, OF WEST PHILADELPHIA, PENNSYLVANIA.

TURNING-LATHE.

Specification of Letters Patent No. 10,783, dated April 18, 1854.

*To all whom it may concern:*

Be it known that I, GARRET MELDRUM, of West Philadelphia, in the county of Philadelphia and State of Pennsylvania, have invented a new and useful machine whereby several pieces of wood or other material (intended each to have the like several curved and uniform sides) may all at the same operation have one of their said sides shaped or turned of a uniform curve and pattern, and in like manner each of the remaining sides in succession; and I do hereby declare that the following is a full, clear, and exact description of the construction and operation of the same, reference being had to the annexed drawings, making a part of this specification, in which—

Figure 1:
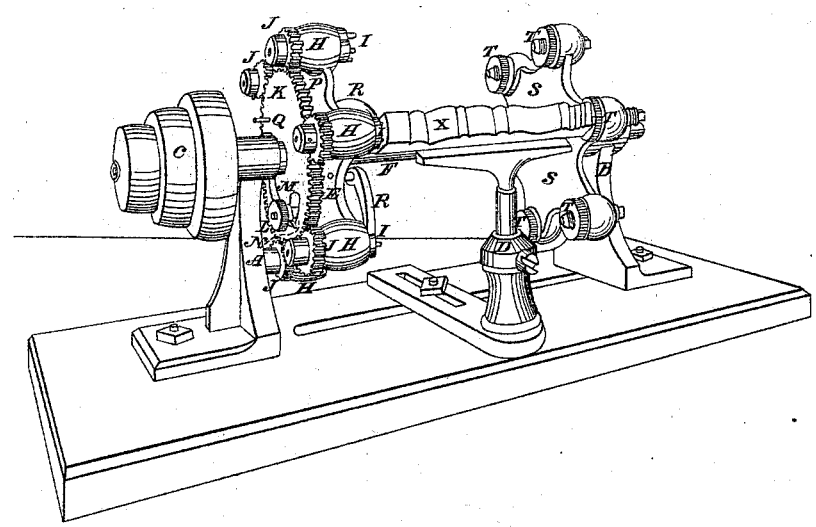
Figure 2:
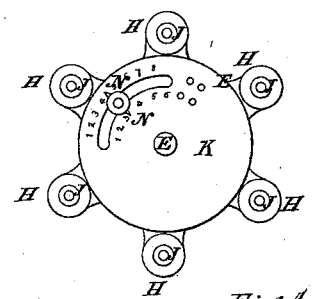
Figure 3:
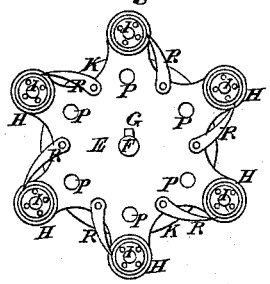
Figures 4, 5:
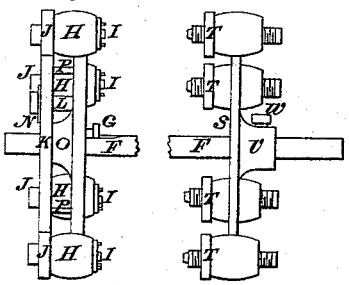

Figure 1 is a perspective view, Fig. 2 a plan view, of one side of the chuck plate, center wheel and pinions; Fig. 3 a plan view of the other or opposite side of the chuck plate; Fig. 4, a vertical section of the same plate and wheels, and Fig. 5 a vertical section of the tail-rest plate.

The same letters refer to like parts in the several figures.

A is a "head stock"; B, a "tail stock"; C, "cone pulleys", and D a "tool rest". These parts are all common to lathes, and are arranged and adjusted on a "bed", as usual, therefore requiring no further description.

I will now proceed to point out and describe the several parts which constitute my newly invented machine.

E is a chuck plate (cast of iron or other suitable material) secured upon the main shaft (F) by means of a gib (G) or otherwise. Around its periphery suitable bosses (H) (six, more or less) are cast at equal distances, in each of which mandrels are adapted, having secured on one end of each a suitable chuck (I) adapted for holding the material to be shaped, and on the other end a pinion (J). Each of these pinions have the same number of teeth, and gear with a central spur wheel (K) which turns loosely on the main shaft (F) near or against the hub of the head stock (A) and is capable of being adjusted and secured permanently to the chuck plate (E) by means of a screw bolt (L) which passes loosely through a concentric slot (M) in the wheel and firmly into the chuck plate. Connected with this bolt and slot is a small indicator (N) which is made so as to point to any one of the several regular divisions marked and numbered on the wheel on each side of the slot at M. The pinions (J) are permanently secured upon their mandrels by means of small bolts or otherwise. The center wheel (K) bears against the hub (O) of the chuck plate, and also against the ends of the pins fastened in the chuck plate near each boss, at (P). There are also four pins (Q) fastened on the outside of the central wheel, between which a bar or lever can be inserted, for the purpose of turning the wheel on the shaft. The central wheel has about four times the number of teeth which are on the pinions, so that one revolution of the pinions is caused by one quarter revolution of the central wheel. On the opposite side of the chuck plate pawls (R) are made to catch in suitable notches cut in the peripheries of the chucks (I), and when these notches are regularly and uniformly cut and numbered they will answer part of the purpose of the indicator (N) and gear wheel and pinions before described, so that either or both devices may be used. The tail rest plate (S) may be cast off the same pattern as the chuck plate. It has, like the chuck plate, suitable bosses around its periphery, and is adjustable on the main shaft, and is placed thereon so that its bosses correspond with those on the chuck plate. Screw mandrels are made so as to operate in the bosses, having their inner ends adapted as "centers" and their outer ends squared and adapted for being operated by means of a wrench or crank. On the inner ends of these mandrels jam nuts (T) are also applied for the purpose of securing the mandrels at any particular place. On one side of the tail rest plate a suitable hub (V) is cast, which is adapted to bear against the like projection on the tail stock and having a set-screw (W) for the purpose of fixing it firmly to the shaft.

I will now proceed to describe the manner of using and the mode of operation of my machine.

The center wheel being secured to the chuck plate by the screw bolt (L), or by means of the pawls (R), the pieces to be shaped are all made about the same length, and each placed with one end upon one of the chucks (I) and the other against the opposite "center" in the tail-rest plate, the tail-rest plate being adjusted to the proper place on the shaft and firmly secured thereon by means of the set screw (W) and the tail stock (B) adjusted so as to bear against the hub of the tail rest plate and firmly secured to the "bed" in the usual manner. After the centered ends of the mandrels are pressed sufficiently into the ends of the pieces to be shaped to secure them against the chucks the jam nuts (T) are screwed up against the bosses. The motive power is now applied and revolution given to the main shaft by means of the pulley, the cutting tool applied and one side of each piece turned. (In the perspective figure one of such pieces of wood (X) is shown as properly placed in the machine and turned or shaped on one side). The whole of the pieces being now finished on one side, the center wheel is turned sufficiently on the shaft to present the next intended sides of the pieces to the cutting tool, which are then shaped, and the succeeding sides in like manner presented and shaped in succession, and thus completed.

The main shaft may be a continuation of the pulley shaft, as shown and described, or it may be a separate shaft and hung upon "centers" in the head and tail-stocks, and driven by a "carrier," as may be deemed most desirable.

By means of this machine it is apparent that a great saving of time and labor is effected in the construction of regular polyhedrous figures, besides the greater accuracy and regularity in their construction attainable by its use.

I do not claim as my invention the mechanical arrangements or combinations for sustaining and communicating a revolution to the machine, as these are common to all lathes; nor do I claim or prescribe any particular kind of tool rest or cutter, as these are also common; but

What I claim as my invention and desire to secure by Letters Patent, is—

1. I claim the chucks (I) and pinions (J) with their mandrels passing through the bosses in the chuck plate (E) in combination with the central spur wheel (K) substantially and for the purpose as herein described.

2. I claim the pawls (R) and their ratchet notches in combination with the chucks (I) substantially and for the purpose as herein described.

3. I claim the screw bolt (L) in combination with the concentric slot (M) in the center wheel (K) and the indicator (N) with the regular divisions, or their equivalents marked on the wheel, substantially and for the purposes as herein described.

4. I claim the adjustable tail rest plate (S) having bosses to correspond with the corresponding bosses in the chuck plate (E) in combination with the screw mandrels and their jam nuts (T), the said tail rest plate being adjustable on the main shaft (F) substantially and for the purposes as herein described and illustrated.

GARRET MELDRUM.

Witnesses:
BENJ. MORISON,
GEO. C. GEYER.